July 13, 1948.  A. H. BAKER  2,445,298
PROCESS FOR PREPARING CELLULAR GLASS SLABS
Original Filed March 31, 1945  3 Sheets-Sheet 1
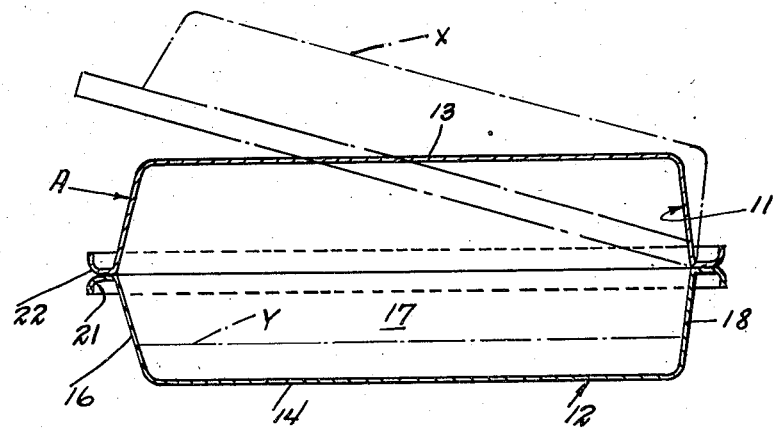
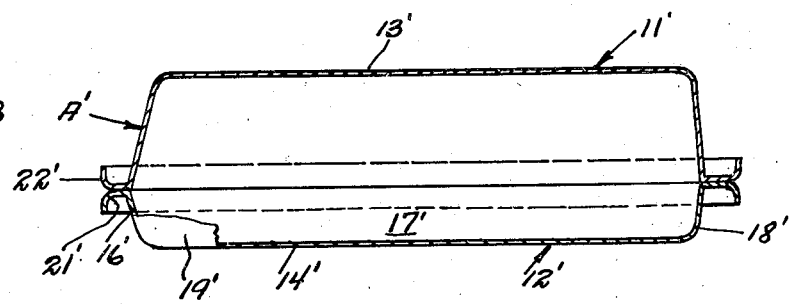
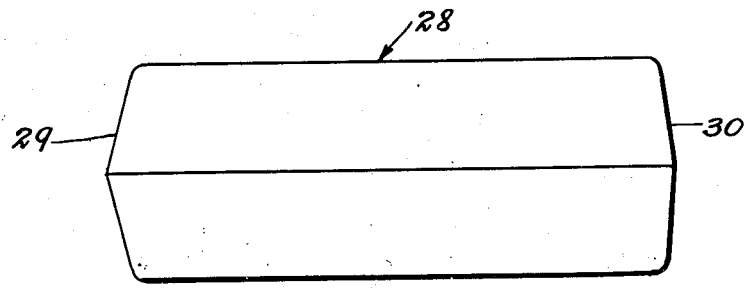
INVENTOR.
A. H. BAKER
BY Olen E. Bee
ATTORNEY.

July 13, 1948. A. H. BAKER 2,445,298
PROCESS FOR PREPARING CELLULAR GLASS SLABS
Original Filed March 31, 1945 3 Sheets-Sheet 2

INVENTOR.
A. H. BAKER
BY Olen E. Bee
ATTORNEY.

July 13, 1948. A. H. BAKER 2,445,298
PROCESS FOR PREPARING CELLULAR GLASS SLABS
Original Filed March 31, 1945 3 Sheets-Sheet 3
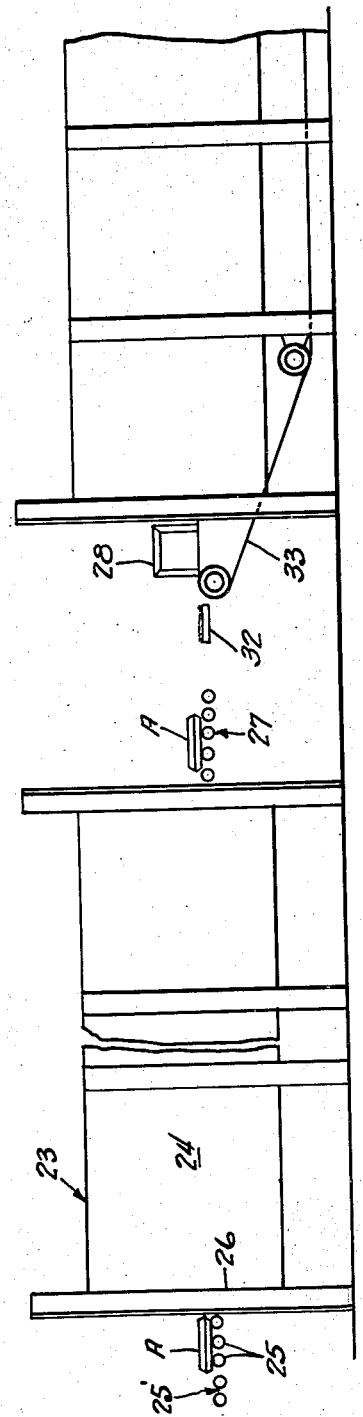
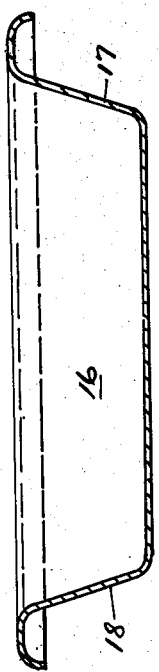
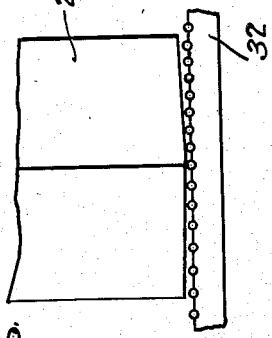
INVENTOR.
A. H. BAKER
BY Olen E. Bee
ATTORNEY.

Patented July 13, 1948

2,445,298

UNITED STATES PATENT OFFICE 2,445,298

PROCESS FOR PREPARING CELLULAR GLASS SLABS

Arvid H. Baker, Port Allegany, Pa., assignor to Pittsburgh Corning Corporation, Allegheny County, Pa., a corporation of Pennsylvania Original application March 31, 1945, Serial No. 585,833. Divided and this application August 22, 1946, Serial No. 692,210

1 Claim. (Cl. 49—89)

The present invention relates to a process of preparing cellular glass slabs or blocks from a mixture of pulverized glass and a gassing agent.

The invention described and claimed herein constitutes a division of my copending application, Ser. No. 585,833, filed March 31, 1945, for Molds and use of the same in the cellulation of glass.

One object of the invention is to provide a simple and economical method of shaping and annealing slabs of cellulated glass.

These and other objects will be apparent from consideration of the following specification and the appended claim.

For a better understanding of the invention reference now may be had to the accompanying drawings in which like numerals refer to like parts and in which:

Figure 1 is a sectional view of a mold for forming cellular glass and being constructed in accordance with the provisions of the present invention.

Figure 3 is a sectional view taken substantially upon the line III—III of Figure 2.

Figure 4 is a fragmentary diagrammatic view of a furnace and an annealing lehr for use in the practice of the invention.

Figure 5 is an elevational view of a cellular slab as obtained from the mold constructed in accordance with the invention.

Figure 6 is a fragmentary view illustrating the treatment of a cellular slab prior to subjecting it to the annealing operation.

Figure 8 is a sectional view of a modified form of mold.

It has heretofore been proposed to prepare an insulating material of low density suitable for use in the thermal insulation of various structures and also for use as a buoyant element in life rafts and various types of floats by heating mixtures of finely pulverized glass and a pulverulent gassing agent such as finely powdered carbon to the temperature of softening of the glass, e. g. to a temperature approximately of 1600° or 1650° F. Of course, a mold of suitable contour and of a material of high resistance to heat and hot gases is required. The resultant bodies (usually slabs or blocks) are subsequently removed from the molds and subjected to a slow and careful annealing operation in order to relieve internal stresses in the cellulated glass. One of the great difficulties heretofore encountered in the preparation of cellular glass by this method has consisted in the extreme difficulty in obtaining molds which were inexpensive and which would withstand the severe conditions of operation over a sufficient period of time to render them feasible for commercial use.

In accordance with the provisions of the present invention, applicant provides a mold structure which includes top and bottom sections which may be of the same or of different depth and which are bread pan-like or frusto-pyramidal in shape. The two sections are so formed that one can be superposed in inverted position upon the other to provide a closed chamber suitable for containing the mixture of powdered glass and gassing agent during the cellulating operation. As a further feature, the invention contemplates a formation of cellular slabs or blocks having wide faces and narrow edges to such a contour as to admit of setting them on edge in the annealing lehr in such a position as to facilitate uniform annealing with a minimum wastage of space and apparatus.

Figure 2:
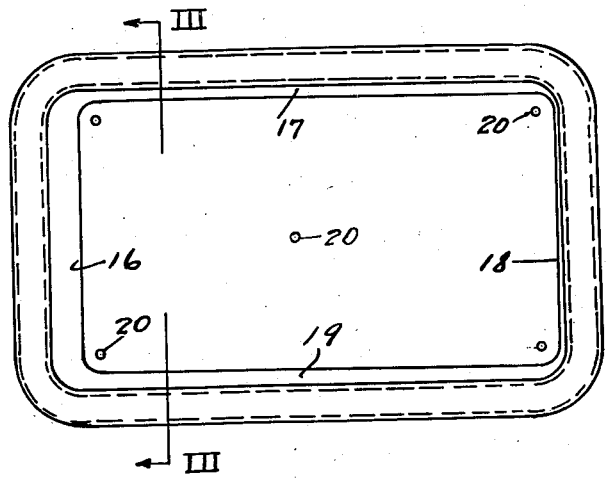
Figure 2 is a plan view of a mold section embodying the principles of the invention.

Molds A or A' suitable for forming cellular blocks in accordance with the provisions of the invention are shown in section in Figures 1 and 2 of the drawings are formed of stainless sheet steel of heavy gauge and include top and bottom portions 11—12 and 11'—12' which may be identical in size and shape as shown in Figure 1 or as shown in Figure 8, the top section being somewhat deeper than the bottom section. The sections include plain bottom walls 13—14 and 13'—14'. Of course, when the sections 11—11' are inverted upon the sections 12—12', the walls 13—13' become the tops of the mold chambers. Each section is also provided with side walls, 16, 17, 18, and 19, or 16', 17', 18', and 19'. It is to be observed that the walls 16—17—19 and 16'—17'—19' are substantially beveled in order to assure a high degree of clearance, thus facilitating the removal of the cellular glass blocks from the molds after they have been formed. The walls 18 or 18' are but slightly beveled, thus providing each block with an edge portion which is nearly flat for a purpose which will be apparent later.

Small holes, e. g., 3/32 inch in diameter indicated at 20 at each corner and in the middle of the sections prevent imprisonment of air in the molds as the mass bloats up. The molds are provided with edge flanges 21—21' extending entirely about the perimeter and preferably being flattened in such a manner as to provide a smooth surface of contact between the top and bottom sections when they are arranged in superposed position. The edges are also formed with down turned lip portions 22—22' which serve to strengthen the flange and assure that the portions 21—21' will remain smooth and flat even after repeated heatings and coolings.

In the practice of the invention, the molds are thinly coated internally with a slurry of clay, bauxite, or the like and the coating dried. The bottom portion of the mold is partially filled, e. g. to the line Y with a pulverulent mixture of very finely powdered glass and carbon. In this operation, glass powdered to a fineness such that most of it will pass through a screen of 200 or 300 mesh is employed. If it is to be desired, the gassing agent may comprise an ordinary lamp black which is used in a ratio of about 0.5%, although somewhat more or somewhat less may be sometimes employed. A promoter of cellulation such as antimony trioxide or calcium sulfate is also added in a small amount, e. g. 0.3%. These ingredients are thoroughly intermixed and leveled off in the bottom section, and the top section is superposed. The molds are then subjected to a heating operation in a suitable furnace such as a roller hearth furnace 23 illustrated diagrammatically in Figure 4. The furnace comprises an elongated shell 24 of refractory material which is supported upon vertical members 26. The molds are carried through the furnace in a reclining position upon a series of continuously driven rollers 25, several of which are disposed externally of the mouth of the furnace to provide a loading platform 25' and another series at the exit end of the furnace providing an unloading platform 27.

The molds as they progress throughout the furnace upon the rollers, are gradually heated to the temperature of sintering of the glass in the mixture. This temperature should never be sufficient to melt the glass down into a truly fluid state, but should only be sufficiently high to render it tacky and somewhat plastic and to generate the gases. This temperature for most glasses such as a conventional one predominantly lime, soda and silica employed in windows, bottles and the like, is approximately 1600° or 1650° F. The molds near the end of the heating operation are completely filled with a mass of coherent glass bloated or cellulated by minute bubbles of gases generated by the reaction of the gassing agent at the temperature of cellulation.

In order to remove the molds from the cellular bodies, it is preferred first to cool the molds down somewhat, for example, to 800° or 900° F., and then to subject them to sudden shock heating which expands the molds without substantially expanding the poorly conductive glass material contained therein. The expanded molds when they emerge from the furnace upon the rollers at the exit end of the furnace, are sufficiently expanded to permit the sections to be pried apart quite readily by the insertion of a blunt instrument between the flanges of the top and the bottom sections. The top mold section can then be tipped up about the flange of the wall 18 or 18' as a fulcrum as indicated in dot and dash line position X in Figure 1. The top section can then easily be lifted off and the bottom section removed from the slab. The sloping sides 16 provide clearance to permit the tipping motion.

The cellular slab or block 28 at this stage is of approximately the outline shown in Figure 5 and comprises substantially wedge or V-like portions 29 about three edges and a base 30 which is more nearly flat.

The slabs at this time are sufficiently cooled upon their surfaces to permit them to be handled by workmen equipped with asbestos gloves or suitable tongs, but the interior thereof is still quite hot, probably almost as hot as the material within the cellulating furnace.

For purposes of annealing the slab, the base portion as shown in Figure 5 is rubbed upon an abrasive element such as a sheet 32 of chain fabric or other abrasion resistant foraminous material shown in Figures 4 and 6 adapted to exert an abrading action. The slabs by reason of cellulated structure, are quite readily abraded by friction against the abrading member and are easily flattened to form a base vertical to the faces of the slabs which permits the blocks or slabs to stand up vertically when they are disposed upon a flat surface.

Figure 7:
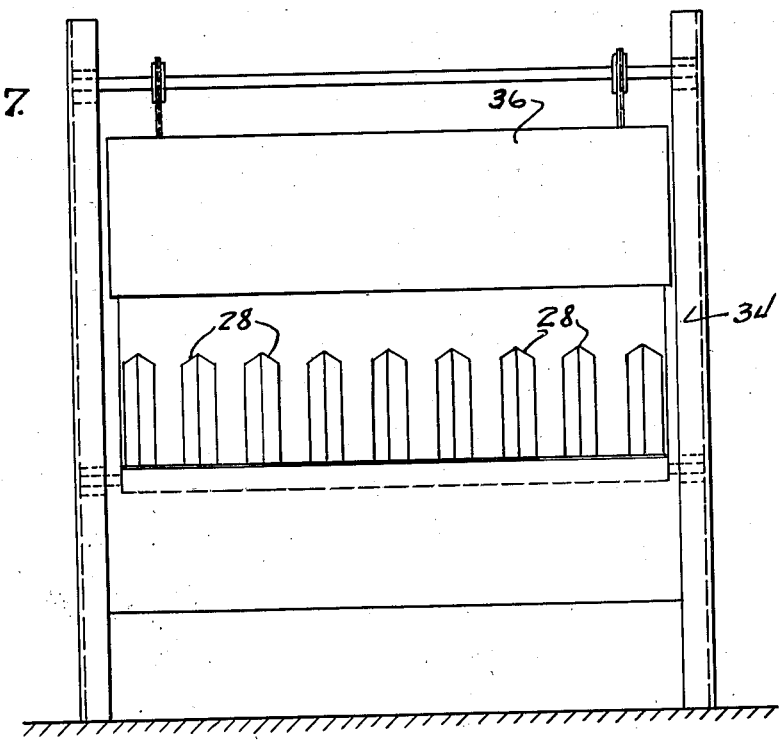
Figure 7 is an elevational view illustrating an annealing lehr used in the practice of the invention.

After the slabs have been removed from the molds, and the base portions flattened, they are set up as shown in Figure 7 in vertical position and in spaced relation upon a chain conveyor belt 33 running continuously at slow speed through an annealing lehr 34 where the temperature is brought down gradually and as evenly as possible through the critical range. Lehr 34, is provided with counterweighted vertically sliding door 36 to keep out cold air.

The forms of the invention herein illustrated are to be considered as being by way of example. It will be apparent to those skilled in the art that numerous modifications may be made therein without departure from the spirit of the invention or the scope of the appended claim.

What I claim is:

In the process of forming cellular glass slabs having relatively wide faces and narrow edges, by sintering pulverized glass admixed with a gassing agent in bread pan-like molds each comprising a section of frustopyramidal shape and having sloping sides and a flat bottom whereby to impart to slabs formed therein beveled edges designed to admit of ready release of the slabs from the molds; the steps of removing the freshly formed slabs from the molds rubbing one of the edges of each upon an abrasive member to provide a flat base at right angles to the faces of the slab, setting the slabs in spaced relation upon said edge surfaces in vertical position in an annealing lehr, then annealing the slab in that position by circulation of air about and between them.

ARVID H. BAKER.